Aug. 1, 1944.                D. A. LARKIN                2,354,867
                                BASKET
                        Filed June 11, 1942            2 Sheets-Sheet 1
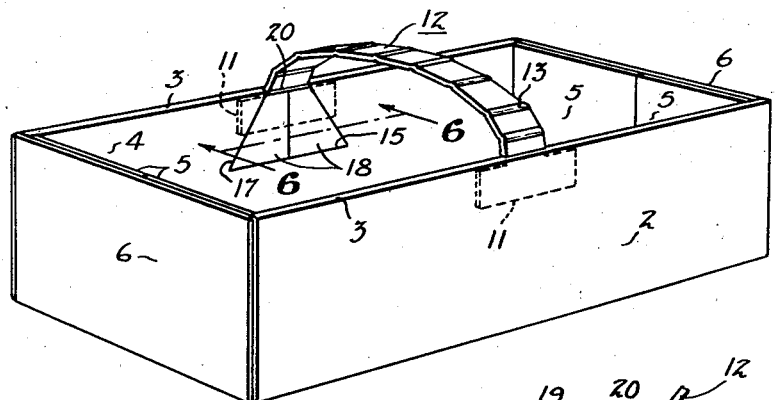
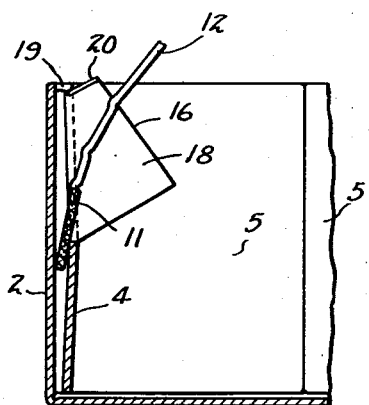
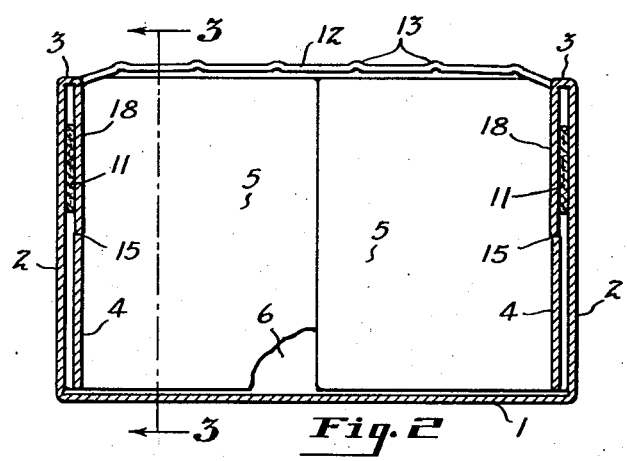
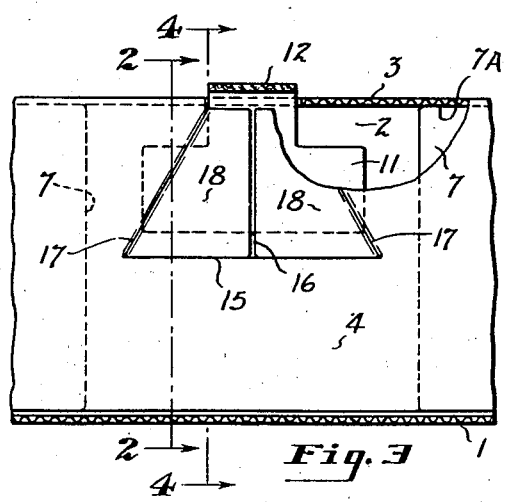
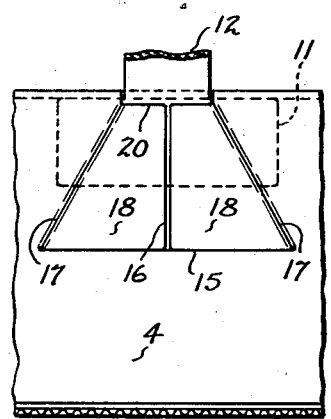
INVENTOR
Daniel A. Larkin
BY Robert W. Wilson
ATTORNEY Aug. 1, 1944.　　　D. A. LARKIN　　　2,354,867
BASKET
Filed June 11, 1942　　　2 Sheets-Sheet 2
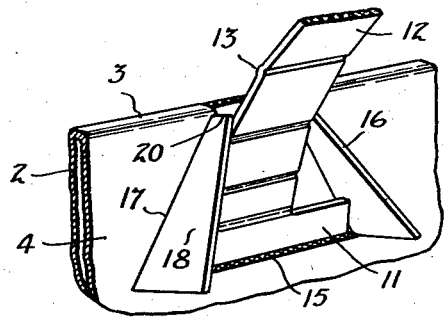
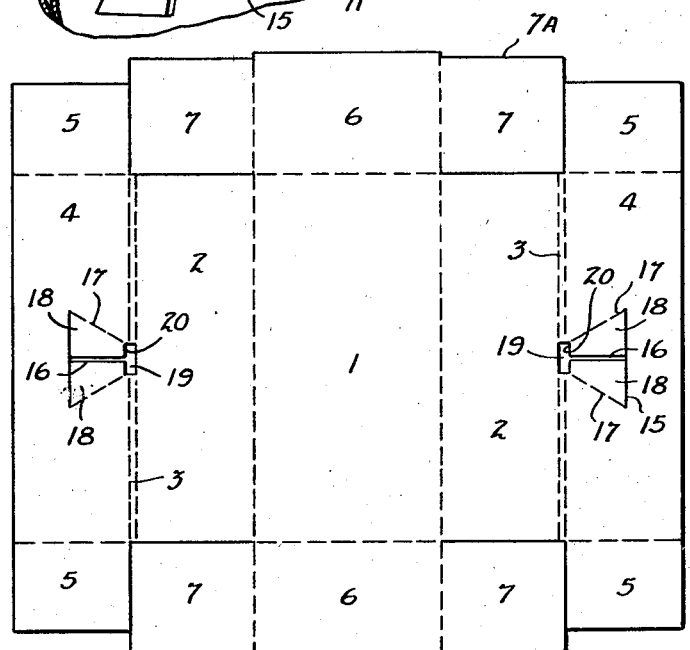
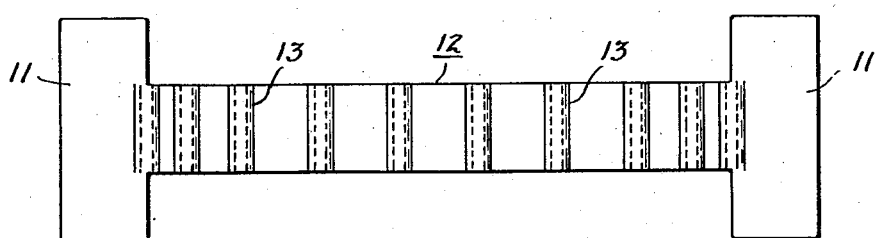
INVENTOR
Daniel A. Larkin
BY
ATTORNEY Patented Aug. 1, 1944

2,354,867

UNITED STATES PATENT OFFICE 2,354,867

BASKET

Daniel A. Larkin, Sandusky, Ohio, assignor to The Hinde & Dauch Paper Company, Sandusky, Ohio, a corporation of Ohio Application June 11, 1942, Serial No. 446,666

3 Claims. (Cl. 229—52)

This invention relates to baskets or similar handled containers particularly adapted to be made of corrugated board and fiber board or similar materials, and has for its purpose the provision of such a basket readily and cheaply manufactured, quickly and easily assembled by unskilled labor and without requiring any mechanical appliances for the purpose, and which can have the handle put out of the way without being removed, so that a pile of such baskets can be stacked after assembly and after filling, but retaining the handle where merely picking the basket up will pull the handle again into carrying position. The construction thus is very simple, impossible to get wrong, economical of assembly and economical of material. Other purposes and advantages of the invention will appear from the following description of a preferred embodiment.

For the accomplishment of the above and similar purposes I prefer to embody the invention in the form shown in the accompanying drawings, although it will be appreciated that modifications thereof may be resorted to without departing from the principles of the invention.

In the accompanying drawings:

Fig. 1 is a perspective showing my improved basket assembled, with the handle in carrying position;

Fig. 2 is a transverse section on plane 2—2 of Fig. 3, looking in the direction of the arrows, showing the handle moved down to position to allow another basket to be stacked on top;

Fig. 3 is a partial interior elevation as generally indicated by arrows 3—3, Fig. 1, showing certain details of the assembly, with the handle grip in section and the handle in lowered position for stacking;

Fig. 4 is a transverse vertical section as indicated by arrows 4—4 of Fig. 3, but showing the parts in another position illustrating the method of inserting the handle;

Fig. 5 is a view corresponding to Fig. 3, but showing the handle raised to carrying position;

Fig. 6 is a perspective of the portion indicated by arrows 3—3, Fig. 1, showing the method of inserting the handle;

Fig. 7 is a developed view of the blank from which my improved basket is made; and Fig. 8 is a developed view of the handle.

Referring now particularly to Figs. 1 and 7, the basket may be formed of a conventional blank in the style usual for such baskets, and folded so as to present the ordinary appearance of baskets made of corrugated board and similar materials. Aside for the handle and features which relate to its insertion, the blank is not novel. In the form of blank illustrated in Fig. 7, the bottom 1 has outer side panels 2 bendably connected thereto which become the outer side walls of the basket body. Each of these is further extended by a double fold connection 3 to a further outward panel 4 which becomes an inner wall. An end extension 5 is bendably connected to each end of each panel 4. Endwise the bottom 1 has a panel 6 at each end with side extensions 7 on each edge of the panel 6. The various bend lines are indicated by dashes in Fig. 7, while full cuts are indicated by solid lines therein.

When the blank is set up the panels 6 become the outer ends, the panels 5 become the inner ends, and the panels 7 are caught between the inner and outer walls 4 and 2, with their upper edges 7A beneath the double fold 3. The panels 7 do not abut, but are substantially spaced apart at their ends as shown in Fig. 3, for the admission of the handle as hereafter described.

The basket body is preferably, although not necessarily, made of corrugated board, while the handle is made of solid fiber with a T-shaped base 11 at each end and the grip portion 12 divided into relatively short lengths by transverse creases 13 which are crosswise of the grip but lengthwise of the basket. These allow the handle to flex without breaking.

The inner walls of the basket body are cut through as at 15 and 16 and creased for a hinge as at 17, the crease being diagonal so that the laps 18 thus formed are wider at bottom than at top. The crease goes from the ends of the full cut 15 to the outer corners of a slot 19 which is cut in the hinge portion 3. The length of the cut 15 is slightly greater than the corresponding dimension of the handle base 11, so as to admit the handle base, as is best shown in Fig. 6. The upper edges 20 of the laps 18 are cut slightly below the fold line of the top hinge 3, as can be seen in Figs. 5 and 6, so as to allow the handle to be set in its down postion as shown in Fig. 2.

To insert the handle after the body blank has been set up, the laps 18 are turned back as in Figs. 4 and 6 and the handle base 11 is pushed down between the inner and outer side walls, and then pulled up to the position of Fig. 3 or Fig. 5, and the flaps 18 are replaced in the plane of their panel 4, as shown in Fig. 1. In carrying the basket the upper edges of the base 11 bear against the under side of the fold connection 3 thus presenting a sufficient bearing surface to carry the weight of the basket. Either one or both sides of the handle may be pushed down for stacking, as is generally indicated in Figs. 2 and 3, so that the handle grip 12 lies across on the general level of the top of the basket and may go down somewhat further than is shown in Fig. 2, inasmuch as the grip is flexible by reason of its creases 13. It is of no importance whether the downward movement to get the handle out of the way is partly on one side and partly on the other, or entirely on one side, although for convenience it is shown in Fig. 2 as being partly on each side. By reason of the notching at the edges 20 the handle can go down below the top level of the hinge portion 3 and thus below the top edges of the basket, so that a stack can be piled up without any excess pressure on the handle areas and without the handles making the stack unsteady. The position which the handle would normally take when pushed down is shown in Fig. 2, but it will be understood that on account of the flexibility of the material the handle may go down further if the load in the basket permits. Obviously the basket may also be used with a cover if desired, in which case the handle when pushed down will rest on top of the cover. Such covers are well understood in the art of corrugated board baskets and consequently not illustrated herein.

Although I have described a preferred form of my invention and the method of assembling the same, my invention is not limited to the exact embodiment shown, which is the preferred embodiment, but is capable of being used in various forms within the scope of the appended claims.

What I claim is:

1. In a basket of corrugated board or similar material having inner and outer side walls, a plurality of laps in said inner side walls severed therefrom at their respective tops and bottoms and hinged thereto between said severances, said laps being wider at bottom than at top, and a handle adapted for engagement between said walls, said handle including a widened base at each end, the width of said base being not greater than that of the bottom of the opening made by said laps, and the width of said handle between said bases being not greater than the width of the top of said opening.

2. In a basket of corrugated board or similar material having inner and outer side walls, a plurality of laps in said inner side walls severed therefrom at their respective tops and bottoms and hinged thereto between said severances, said laps being wider at bottom than at top, and a handle adapted for engagement between said walls, said handle including a widened base at each end, the width of said base being not greater than that of the bottom of the opening made by said laps, and the width of said handle between said bases being not greater than the width of the top of said opening, the upper edges of said laps being set below the upper edge of the side wall a distance approximately equal to the thickness of said handle.

3. A basket of corrugated board or similar material having inner and outer side walls connected by top edge folds, said folds each having a slot therein midway between its ends, said inner walls each having a slot extending downwardly from the central portion of one of said top slots, a cut across the lower end of said downwardly extending slot that extends beyond the ends of the top slot and downwardly diverging creases extending from the ends of the top slot to the ends of said cut, thereby providing an upwardly tapering opening and a pair of upwardly tapering hinged laps for closing said opening, and a handle having a flat retaining portion at each end wider than said edge slots but of a width less than the length of said cuts and adapted to be inserted through one of said openings into the space between the inner and outer walls, said handle having a grip portion connecting said retaining portions that is narrower than said retaining portions and adapted to be received in said top slots.

DANIEL A. LARKIN.